United States Patent [19]

Snyder

[11] 4,038,237
[45] July 26, 1977

[54] FIRE RETARDANT WIRE COATING
[75] Inventor: John L. Snyder, Houston, Tex.
[73] Assignee: Shell Oil Company, Houston, Tex.
[21] Appl. No.: 697,181
[22] Filed: June 17, 1976
[51] Int. Cl.$^2$ ............................ C08K 5/01; C08K 5/02
[52] U.S. Cl. .................... 260/33.6 AQ; 252/8.1; 260/33.8 UA; 260/42.46; 260/42.47; 260/45.7 ST; 260/45.75 B; 260/DIG. 24
[58] Field of Search ............ 260/33.6 AQ, 42.46, 260/42.47, 45.7 ST, 33.8 UA, DIG. 24; 252/8.1

[56] References Cited
U.S. PATENT DOCUMENTS

| | | | |
|---|---|---|---|
| 2,669,521 | 2/1954 | Bierly | 260/42.46 |
| 3,250,739 | 5/1968 | Sauer et al. | 260/42.46 |
| 3,459,830 | 8/1969 | Legge et al. | 260/33.6 PQ |
| 3,464,850 | 9/1969 | Haefele | 260/880 B |
| 3,489,715 | 1/1970 | Bierwirth et al. | 252/8.1 |
| 3,639,163 | 2/1972 | Bishop et al. | 260/42.22 |
| 3,933,731 | 1/1976 | Machi et al. | 260/42.46 |

OTHER PUBLICATIONS

Encyclopedia of Pol. Sci. & Techn. (vol. 7) (Interscience) (N.Y.) (1967), pp. 15–18, 26.
Abe-Chem. Abs. 79, 79855v (1973).

Primary Examiner—Donald E. Czaja
Assistant Examiner—H. H. Fletcher
Attorney, Agent, or Firm—Dean F. Vance

[57] ABSTRACT

A fire-resistant polymer composition is disclosed which is useful in coating electrical conductors. The composition comprises a block copolymer, extending oil, polymeric alpha-olefin, fire retardants and a calcium sulfate filler.

8 Claims, No Drawings

FIRE RETARDANT WIRE COATING

BACKGROUND OF THE INVENTION

Various materials have been utilized in the past for coating and insulating electrical conductors. Among the more commonly used coatings are the conventional enamel or resinous varnish-type coatings, polyvinyl resins, polystyrene resins, etc. All these coating compositions, while providing insulation, have been found to be lacking in one respect or another or to inherently involve certain disadvantages. For example, the enamel or varnish coatings lack adequate flexibility. Rubber coatings such as polybutadiene, ethylene-propylene rubbers, and natural rubber require vulcanization in order to obtain their maximum desired set of physical properties. Furthermore, most rubber coatings deteriorate with age and exposure to the atmosphere, resulting in the cracking and peeling of the rubber coatings. The polyvinyl and polystyrene resin coatings must be plasticized in order to have sufficient flexibility. Such coatings often lose plasticizers during aging and then become brittle.

Recent improvements in the art of polymerization have enabled the production of certain block copolymers which have been found to be eminately suitable for electrical conductor coatings in view of their unexpectedly superior set of electrical properties combined with their superior physical properties. However, these coatings, such as the coatings disclosed in U.S. Pat. No. 3,639,163, lack sufficient fire resistance to be useful in many desirable applications.

SUMMARY OF THE INVENTION

A novel fire-resistant polymer composition has been found that is very suitable for the coating of electrical conductors for use in high temperature service. This composition comprises a selectively hydrogenated block copolymer, an extending oil, polymeric alpha-olefin, fire retardant, and as the inorganic filler, calcium sulfate. Compositions employing calcium sulfate in place of other fillers such as clay, silicates, and calcium carbonate have much improved fire retardant properties.

DETAILED DESCRIPTION OF THE INVENTION

The present invention is a fire-resistant polymer composition comprising:

a. 100 parts by weight of a block copolymer having at least two polymer end blocks A and at least one polymer mid block B, each block A being a non-elastomeric polymer block of a monoalkenyl arene having an average molecular weight of between about 2,000 and about 125,000 and each block B being an elastomeric hydrogenated polymer block of a conjugated diene, having an average molecular weight between about 10,000 and about 250,000;
b. 0–200 parts by weight of an extending oil;
c. 10–300 parts by weight of a polymeric alpha-olefin;
d. 5–100 parts by weight of antimony trioxide;
e. 25–200 parts by weight of a chlorinated hydrocarbon; and
f. 50–300 parts by weight of a calcium sulfate filler.

The block copolymers contemplated for use in these compositions have two essential types of blocks, A and B. At least two end blocks A are present and at least one mid block B is present in the block copolymer. The copolymer may be either linear or branched in structure and mixtures of such configurations may be employed. Blocks A comprise predominantly polymer blocks of at least one monoalkenyl arene while blocks B comprise predominantly hydrogenated polymer blocks of at least one conjugated diene. Moreover, blocks A are characterized in that no more than 25% of the original aromatic double bonds are reduced by hydrogenation while blocks B are characterized by having at least 75% of their aliphatic double bonds reduced by hydrogenation. It is possible, in fact, to prepare block copolymers in which the blocks B are poly(alphamonoolefin) blocks which are regarded here as being substantially equivalent to substantially completely hydrogenated polymer blocks of conjugated dienes. The remaining specification and the claims are meant to include within their scope these alphamonoolefin equivalents of fully hydrogenated polymer blocks of conjugated dienes.

Blocks A are prepared by block polymerization of such monomers as styrene, alphamethyl styrene, tertbutyl styrene and vinyl toluene. Blocks B are prepared by block polymerization of conjugated dienes such as butadiene or isoprene and thereafter hydrogenating the polymer block. When the diene employed is butadiene, it is prefered that polymerizaton conditions be adjusted to result in a polymer block having from about 35 to about 55% 1,2 structure. Thus, when such a block is hydrogenated, the resulting product is, or resembles, a regular copolymer block of ethylene and butene-1 If the conjugated diene employed is isoprene, the resulting hydrogenated product is or resembles a regular copolymer block of ethylene and propylene (EP). See generally U.S. Pat. No. 3,595,942.

For simplicity, reference will be made to several basic types of block copolymers especially contemplated herein. However, it will be understood that block copolymers may be prepared by coupling polymeric lithium carbanions, some of which may leave coupling agent residues. Linear as well as branched multi-block structures also are contemplated. The methods are known in the art of synthesizing both linear and branched block copolymers, using sequential polymerization alone or sequential polymerization followed by coupling procedures.

Typical block copolymers especially contemplated are the following:

1. Polystyrene-hydrogenated polybutadiene-polystyrene.
2. Polystyrene-hydrogenated polyisoprene-polystyrene.
3. Poly(alphamethyl styrene)-hydrogenated polybutadiene-poly(alphamethyl styrene).
4. Poly(alphamethyl styrene)-hydrogenated polyisoprene-poly(alphamethyl styrene).

Each block A has an average molecular weight between about 2,000 and 125,000, preferably between about 5,000 and 50,000. Each block B has an average molecular weight between about 10,000 and 250,000, preferably between about 30,000 and 150,000. These are number average molecular weights determined by such methods as tritium counting or osmotic pressure measurements. The A block content of the block copolymer is preferably between about 20% and about 60% based on the total weight of the copolymer. The purpose of the latter restriction is to promote the self-vulcanizing feature of these particular materials, which is important in maintaining the favorable electrical properties of the composition.

The term "extending oils" as used in the description of this invention, broadly encompasses not only the usual extending oils for rubbers prepared from petroleum fractions but also contemplates the use of olefin oligomers and low molecular weight polymers. The petroleum derived extending oils which maybe employed include relatively high boiling materials having number average molecular weights between about 300 and 1,400. The oligomers may be polypropylenes, polybutenes, hydrogenated polyisoprene, hydrogenated polybutadiene, or the like having average molecular weights between about 350 and about 10,000. The amount of extending oil employed varies from about 0 to about 200 phr (parts by weight per hundred parts by weight of rubber), preferably about 50 to about 100 phr.

The polymeric alpha-olefin component is preferably isotactic polypropylene, which is an essentially crystalline polypropylene. The solid isotactic polypropylene has weight average molecular weight of between about 200,000 and about 300,000, preferably between about 225,000 and about 275,000. The mount of polymeric alpha-olefin employed typically varies from about 10 to about 300 phr, preferably about 50 to about 150 phr.

The antimony trioxide component ($Sb_2O_3$) is essential for flame retardance reasons and may be produced in any suitable process. The amount of antimony trioxide employed varies from about 5 to about 100 phr, preferably about 10 to about 30 phr.

The chlorinated hydrocarbon employed is preferably a fire retardant compound derived from hexachlorocyclopentadiene (HEX). One of the derivatives employed, and adduct of HEX, is perchloropentacyclodecane, which is typically produced by the aluminum chloride-catalyzed dimerization of hexachlorocyclopentadiene in a chlorinated solvent. This dimer is commercially available from Hooker Chemical Company under the tradename DECLORANE 510.

Another adduct employed in the instant composition is the Diels-Adler product made by adding 2 moles of hexachlorocyclopentadiene to one mole of the stable cis-isomer of 1,5-cyclooctadiene. The structure of the adduct is:

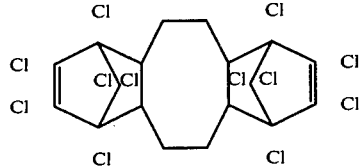

One method to prepare the compound is disclosed in U.S. 3,385,819. This adduct is commercially available from Hooker Chemical Company under the tradename DECHLORANE® Plus 25 and 515.

The quantity of the chlorinated hydrocarbon employed varies from about 25 to about 200 phr, preferably from about 25 to about 100 phr.

An essential component of the instant invention is a calcium sulfate filler. The term "calcium sulfate" encompasses not only the anhydrous salt, $CaSO_4$, but also includes its two hydrates–the dihydrate, $CaSO_4 \times 2H_2O$, and the hemihydrate, $CaSO_4 \times 0.5H_2O$. The principal commercial forms are gypsum, the naturally occuring dihydrate; plaster of Paris, the hemihydrate, formed by calcining gypsum; and anhydrate, $CaSO_4$, occuring as a mineral and prepared in both insoluble and soluble forms by dehydration of gypsum. Preferably, the anhydrate $CaSO_4$ is employed as the inorganic filler.

The calcium sulfate may be obtained from a variety of sources. Among the various sources are gypsum, alabaster, selenite, satin spar, anhydrite, gypsite and gypsum sands. See generally Kirk-Othmer Encyclopedia of Chemical Technology, Volume 4, pages 14–27 (second edition, 1967).

The amount of calcium sulfate filler employed varies from about 50 to about 300 phr, preferably about 150 to about 250 phr.

Other additives such as pigments, extenders, antioxidants, u.v. stabilizers, and other fire retardants may also be added. The additives that can be incorporated should be selected from those whose electrical properties are such as will not materially reduce or impair the electrical properties of the composition. The amount of such additives included in the composition will, of course, depend upon the particular block copolymer being employed and the ultimate use being made of the composition.

The various components may be combined in any suitable manner including solution blending, melt blending, and dry blending. The compositions of the present invention may then suitably be employed as wire coatings. These compositions are especially superior for use as insulators for electrical conductors not only because of their superior electrical properties, but also for their high degree of adherence to metallic surfaces without special treatment of such surface. The electrical conductors usually employed with the instant compositions are metallic wires such as copper, silver, aluminum, and alloys thereof.

The invention is further illustrated by reference to the following Illustrative Embodiments, which are presented for the purpose of illustraton only, and the invention is not to be limited to the particular ingredients and operating conditions disclosed.

ILLUSTRATIVE EMBODIMENT I

In Illustrative Embodiment I, four wire coating compositions were formulated and extrusion coated on an 18 AWG bare copper wire (0.030 inch coating). In each case, the block polymer employed was a selectively hydrogenated styrene-butadiene-styrene block copolymer (SEBS). Other common ingredients included a rubber compounding oil, polypropylene resin, antioxidant package [Plastonox 2246 (2,2'methylenebis (4-methyl-6-tertiarybutyl phenol) and Plastonox DLTDP (di-lauryl thiodipropionate)], and two fire retardants - antimony trioxide and Dechlorane Plus 25 chlorinated hydrocarbon.

In composition number 1, a talc filler was employed, while in composition number 2, a clay filler was employed. The filler in composition number 3 was Camel-CARB, a calcium carbonate filler. In composition number 4, the filler was anhydrous $CaSO_4$ obtained from United States Gypsum under the tradename, SNOW WHITE filler.

These various wire coatings were subjected to a standard vertical flame test according to the method of UL-83. Only the $CaSO_4$-filled composition was self-extinguishing, the other three formulations were not self-extinguishing.

The various compositions in parts by weight are presented below in Table 1.

Table 1

| Composition No. | 1 | 2 | 3 | 4 |
|---|---|---|---|---|
| Component | | | | |
| Block copolymer | 100 | 100 | 100 | 100 |
| Oil | 100 | 100 | 100 | 100 |
| Polypropylene resin | 25 | 25 | 25 | 25 |
| Filler, type | Talc | Clay | $CaCO_3$ | $CaSO_4$ |
| amount | 150 | 150 | 250 | 175 |
| Antioxidant | | | | |
| Plastonox 2246 | 2 | 2 | 2 | 2 |
| Plastonox DLTDP | 0.5 | 0.5 | 0.5 | 0.5 |
| Fire retardants | | | | |
| $Sb_2O_3$ | 30 | 30 | 30 | 30 |
| Dechlorane +25 | 90 | 90 | 90 | 90 |
| Test Results | Burns | Burns | Burns | Self-Extinguishing |

What is claimed is:

1. A fire-resistant polymer composition comprising:
  a. 100 parts by weight of a block copolymer having at least two polymer end blocks A and at least one polymer mid block B, each block A being a non-elastomeric polyer a monoalkenyl arene having an average molecular weight of between about 2,000 and about 125,000 and having no more than 25% of the aromatic double bonds being reduced by hydrogenation, and each block B being an elastomeric hydrogenated polymer block of a conjugated diene, having an average molecular weight between about 10,000 and about 250,000;
  b. 0–200 parts by weight of an extending oil;
  c. 10–300 parts by weight of a polymeric alpha-olefin;
  d. 5–100 parts by weight of antimony trioxide;
  e. 25–200 parts by weight of a chlorinated hydrocarbon; and
  f. 50–300 parts by weight of a calcium sulfate filler.

2. A composition according to claim 1 wherein the calcium sulfate filler is selected from the group consisting of the anhydrous salt, $CaSO_4$; the dihydrate, $CaSO_4 \times 2H_2O$; the hemihydrate, $CaSO_4 \times 0.5H_2O$; and mixtures thereof.

3. A composition according to claim 1 wherein the calcium sulfate employed is the anhydrous salt $CaSO_4$.

4. A composition according to claim 1 wherein the A block is styrene and the conjugated diene is butadiene.

5. A composition according to claim 1 wherein the polymeric alpha-olefin is isotactic polypropylene.

6. A composition according to claim 1 wherein the chlorinated hydrocarbon is an adduct of hexachlorocyclopentadiene.

7. A composition according to claim 1 where the amount of extending oil varies from about 50 to about 100 parts by weight.

8. A composition according to claim 1 wherein the molecular weight of the A blocks are between about 5,000 and 50,000 and the molecular weight of the B blocks are between 30,000 and 150,000.

* * * * *